(12) United States Patent
Mokerji

(10) Patent No.: US 6,346,327 B1
(45) Date of Patent: *Feb. 12, 2002

(54) CHROME COATED ARTICLE

(75) Inventor: Subrata Mokerji, Shelby Township, MI (US)

(73) Assignee: MascoTech Coatings, Inc., China Township, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/905,208

(22) Filed: Aug. 1, 1997

(51) Int. Cl.$^7$ ............................................. B32B 15/04
(52) U.S. Cl. ..................... 428/412; 428/457; 428/461; 428/463; 428/480; 428/475.5; 428/520; 428/522; 428/558
(58) Field of Search ................. 428/457, 558, 428/461, 463, 412, 480, 475.5, 520, 522

(56) References Cited

U.S. PATENT DOCUMENTS

| | | | |
|---|---|---|---|
| 3,838,512 A | 10/1974 | Sanderson | 30/346.54 |
| 3,977,839 A | 8/1976 | Palisin, Jr. | 428/626 |
| 4,109,052 A | 8/1978 | Anderson | 428/405 |
| 4,148,967 A | 4/1979 | Satoh et al. | 428/416 |
| 4,305,981 A | 12/1981 | Muroi et al. | 428/31 |
| 4,321,299 A | 3/1982 | Frazer | 442/375 |
| 4,369,225 A | 1/1983 | Manabe et al. | 428/334 |
| 4,374,717 A | 2/1983 | Drauglis et al. | 204/192.14 |
| 4,591,418 A | * 5/1986 | Snyder | 204/192 |
| 4,911,811 A | 3/1990 | Mullaney, Jr. | 204/192.14 |
| 4,931,366 A | 6/1990 | Mullaney, Jr. | 428/622 |
| RE34,173 E | 2/1993 | Kerber | |
| 5,510,164 A | 4/1996 | Best et al. | 428/64.1 |
| 5,586,280 A | * 12/1996 | Gibbons | 428/626 |
| 5,589,280 A | 12/1996 | Gibbons et al. | 428/626 |
| 5,656,335 A | 8/1997 | Schwing et al. | 427/447 |

* cited by examiner

Primary Examiner—Leszek Kiliman
(74) Attorney, Agent, or Firm—Myron B. Kapustij; Lloyd D. Doigan

(57) ABSTRACT

An article is coated with a multi-layer coating comprising a polymeric layer deposited on the surface of the article and a decorative chrome, chrome/nickel alloy, or chromium nitride layer deposited on the polymeric layer.

23 Claims, 1 Drawing Sheet

CHROME COATED ARTICLE

DESCRIPTION OF THE PREFERRED EMBODIMENT

Figure 1:
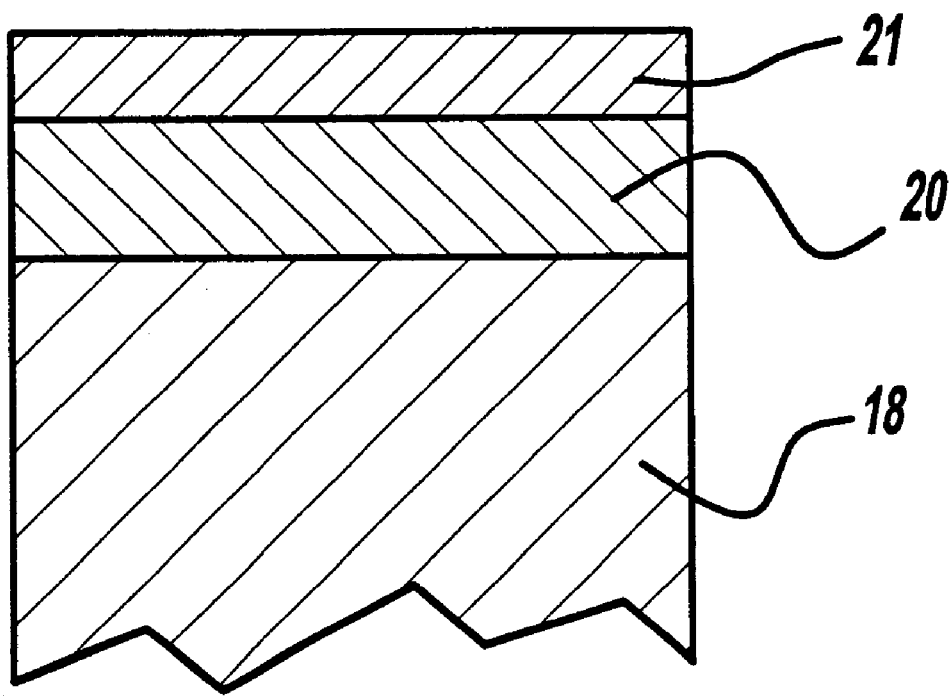
FIG. 1 is a cross-sectional view, not to scale of a portion of the substrate having the multi-layer coating on its surface.

The article or substrate 18 can be comprised of any suitable material such as plastic, ceramic, metal or metal alloy. The metals include nickel, aluminum, copper, steel and zinc. The metal alloys include nickel alloys and brass. The plastics forming the substrate include polycarbonates, nylon, acrylonitrile-butadiene-styrene, polyesters, polyvinylchlorides, and the like. In one embodiment the article is part of a vehicle, such as for example, a wheel cover.

Over the surface of the substrate 18 is deposited a polymeric or resinous layer 20. The polymeric or resinous layer or basecoat 20 may be comprised of both thermoplastic and thermoset polymeric or resinous material. These polymeric or resinous materials include the well known, conventional and commercially available polycarbonates, polyacrylates, polymethacrylates, nylons, polyesters, polypropylenes, polyepoxies, alkyds and styrene containing polymers such as polystyrene, styrene-acrylonitrile (SAN), styrene-butadiene, acrylonitrile-butadiene-styrene (ABS), and blends and copolymers thereof.

The polycarbonates are described in U.S. Pat. Nos. 4,579,910 and 4,513,037, both of which are incorporated herein by reference.

Nylons are polyamides which can be prepared by the reaction of diamines with dicarboxylic acids. The diamines and dicarboxylic acids which are generally utilized in preparing nylons generally contain from two to about 12 carbon atoms. Nylons can also be prepared by additional polymerization. They are described in "Polyamide Resins", D. E. Floyd, Reinhold Publishing Corp., New York, 1958, which is incorporated herein by reference.

The polyepoxies are disclosed in "Epoxy Resins", by H. Lee and K. Neville, McGraw-Hill, New York, 1957, and in U.S. Pat. Nos. 2,633,458; 4,988,572; 4,680,076; 4,933,429 and 4,999,388, all of which are incorporated herein by reference.

The polyesters are polycondensation products of an aromatic dicarboxylic acid and a dihydric alcohol. The aromatic dicarboxylic acids include terephthalic acid, isophthalic acid, 4,4'-diphenyl-dicarboxylic acid, 2,6-naphthalenedicarboxylic acid, and the like. Dihydric alcohols include the lower alkane diols with from two to about 10 carbon atoms such as, for example, ethylene glycol, propylene glycol, cyclohexanedimethanol, and the like. Some illustrative non-limiting examples of polyesters include polyethylene terephthalate, polybutylene terephthalate, polyethylene isophthalate, and poly(1,4-cyclohexanedimethylene terephthalate). They are disclosed in U.S. Pat. Nos. 2,465,319; 2,901,466 and 3,047,539, all of which are incorporated herein by reference.

The polyacrylates and polymethacrylates are polymers or resins resulting from the polymerization of one or more acrylates such as, for example, methyl acrylate, ethyl acrylate, butyl acrylate, 2-ethylhexyl acrylate, etc., as well as the methacrylates such as, for instance, methyl methacrylate, ethyl methacrylate, butyl methacrylate, hexyl methacrylate, etc. Copolymers of the above acrylate and methacrylate monomers are also included within the term "polyacrylates or polymethacrylates" as it appears herein. The polymerization of the monomeric acrylates and methacrylates to provide the polyacrylate resins useful in the practice of the invention may be accomplished by any of the well known polymerization techniques.

The styrene-acrylonitrile and acrylonitrile-butadiene-styrene resins and their preparation are disclosed, inter alia, in U.S. Pat. Nos. 2,769,804; 2,989,517; 2,739,142; 3,991,136 and 4,387,179, all of which are incorporated herein by reference.

The alkyd resins are disclosed in "Alkyd Resin Technology", Patton, Interscience Publishers, N.Y., N.Y., 1962, and in U.S. Pat. Nos. 3,102,866; 3,228,787 and 4,511,692, all of which are incorporated herein by reference.

These polymeric materials may optionally contain the conventional and well known fillers and reinforcing materials such as mica, talc and glass fibers.

The polymeric layer or basecoat 20 may be applied onto the surface of the substrate by any of the well known and conventional methods such as dipping, spraying, brushing and in chamber plasma process.

The polymeric layer 20 functions, inter alia, to level the surface of the substrate, cover any scratches or imperfections in the surface and provide a smooth and even surface for the deposition of the chrome layer.

The polymeric layer 20 has a thickness at least effective to level out the surface of the substrate. Generally, this thickness is from about 0.1 mil to about 10 mils, preferably from about 0.2 mil to about 5 mils, and more preferably from about 0.3 mil to about 1.5 mils.

The chrome layer 21 may be deposited on the plastic layer 20 by any of the conventional and well known chrome deposition techniques including vapor deposition such as physical vapor deposition and electroplating techniques. The electroplating techniques along with various chrome plating baths are disclosed in Brassard, "Decorative Electroplating—A Process in Transition", Metal Finishing, pp. 105–108, June 1988; Zaki, "Chromium Plating", PF Directory, pp. 146–160; and in U.S. Pat. Nos. 4,460,438, 4,234,396 and 4,093,522, all of which are incorporated herein by reference.

Chrome plating baths are well known and commercially available. A typical chrome plating bath contains chromic acid or salts thereof, and catalyst ion such as sulfate or fluoride. The catalyst ions can be provided by sulfuric acid or its salts and fluosilicic acid. The baths may be operated at a temperature of about 112°–116° F. Typically in chrome plating a current density of about 150 amps per square foot, at about five to nine volts is utilized.

Generally, the plating of trivalent chrome is preferred because of environmental considerations.

The vapor deposition of the chrome is conventional and well known in the art and includes techniques such as cathodic arc evaporation (CAE) or sputtering. Sputtering techniques and equipment are disclosed, inter alia, in J. Vossen and W. Kern "Thin film Processes II", Academic Press, 1991; R. Boxman et al, "Handbook of Vacuum Arc Science and Technology", Noyes Pub., 1995; and U.S. Pat. Nos. 4,162,954 and 4,591,418, all of which are incorporated herein by reference.

Briefly, in the sputtering deposition process a metal (i.e., chrome) target, which is the cathode, and the substrate are placed in a vacuum chamber. The air in the chamber is evacuated to produce vacuum conditions in the chamber. An inert gas, such as Argon, is introduced into the chamber. The gas particles are ionized and are accelerated to the target to dislodge titanium or zirconium atoms. The dislodged target material is then typically deposited as a coating film on the substrate.

In cathodic arc evaporation, an electric arc of typically several hundred amperes is struck on the surface of a metal cathode such as chrome. The arc vaporizes the cathode material, which then condenses on the substrates forming a coating.

The chrome/nickel alloy layer may be deposited on the plastic layer 20 by any of the conventional and well known chrome deposition techniques including vapor deposition such as physical vapor deposition and electroplating techniques. The electroplating techniques along with various chrome/nickel plating baths are disclosed in Brassard, "Decorative Electroplating—A Process in Transition", Metal Finishing, June 1988; Zaki, "Chromium Plating", PF Directory; and in U.S. Pat. Nos. 4,460,438, 4,234,396 and 4,093,522, all of which are incorporated herein by reference.

Chrome/nickel plating baths are well known, conventional and commercially available. A typical chrome/nickel plating bath contains chromic acid or salts thereof, and catalyst ion such as sulfate or fluoride. The catalyst ions can be provided by sulfuric acid or its salts and fluosilicic acid. The baths also may contain nickel sulfate, nickel chloride and boric acid. These baths can include a number of well known and conventionally used compounds such as leveling agents, brighteners, and the like. The baths may be operated at a temperature of about 112°–116° F. Typically in chrome/nickel plating a current density of about 150 amps per square foot, at about five to nine volts is utilized.

The vapor deposition of the chrome/nickel alloy is conventional and well known in the art and includes techniques such as cathodic arc evaporation (CAE) or sputtering. Sputtering techniques and equipment are disclosed, inter alia, in J. Vossen and W. Kern "Thin film Processes II", Academic Press, 1991; R. Boxman et al, "Handbook of Vacuum Arc Science and Technology", Noyes Pub., 1995; and U.S. Pat. Nos. 4,162,954 and 4,591,418, all of which are incorporated herein by reference.

Briefly, in the sputtering deposition process a metal (i.e., chrome/nickel alloy) target, which is the cathode, and the substrate are placed in a vacuum chamber. The air in the chamber is evacuated to produce vacuum conditions in the chamber. An inert gas, such as Argon, is introduced into the chamber. The gas particles are ionized and are accelerated to the target to dislodge chrome and nickel atoms. The dislodged target materials is then typically deposited as a coating film on the substrate.

In cathodic arc evaporation, an electric arc of typically several hundred amperes is struck on the surface of a metal cathode such as chrome/nickel alloy. The arc vaporizes the cathode material, which then condenses on the substrates forming a coating.

The chrome/nickel alloy which comprises layer 21 generally contains, in percent by weight, from about 5% to about 95% nickel and from about 95% to about 5% chrome, preferably from about 50% to about 90% nickel and from about 10% to about 50% chrome, and more preferably from about 70% to about 90% nickel and from about 10% to about 30% chrome.

The thickness of the chrome or chrome/nickel alloy layer 21 is at least a thickness effective to provide a protective layer and a decorative appearance to the article. Generally this thickness is from about 200 Angstroms to about 35 microns, preferably from about 2,000 Angstroms to about 5,000 Angstroms.

By protective is meant protection of the underlying substrate against corrosion, abrasion, scratching and the like.

In another embodiment layer 21 is comprised of chromium nitride. The chromium nitride layer has the appearance of dark chrome and is deposited by vapor deposition in the presence of nitrogen. The physical vapor deposition processes include reactive sputtering and reactive cathodic arc deposition. Reactive cathodic arc evaporation and reactive sputtering are generally similar to ordinary sputtering and cathodic arc evaporation except that a reactive gas, in this case nitrogen, is introduced into the chamber which reacts with the dislodged target material. Thus, the cathode is comprised of chrome and nitrogen is the reactive gas introduced into the chamber.

The chromium nitride containing layer 21 is generally of the same thickness as the chrome and chrome/nickel alloy layer described supra.

In order that the invention may be more readily understood the following example is provided. The example is illustrative and does not limit the invention thereto.

EXAMPLE 1

A steel substrate is ultrasonically cleaned and then heated at 250° F. to remove moisture. A basecoat polymeric layer is applied onto the cleaned and dried steel substrate by a standard and conventional high volume low pressure gun. The polymer is comprised of 35 weight percent styrenated acrylic resin, 30 weight percent melamine formaldehyde resin, and 35 weight percent bisphenol A epoxy resin. The polymer is dissolved in sufficient solvents to prevent a polymeric composition containing about 43 weight percent solids. After the basecoat is applied onto the substrate the substrate is allowed to sit for 20 minutes for ambient solvent flash off. The substrate is then baked at 375° F. for two hours. The resulting cured polymeric basecoat has a thickness of about 0.8 mil.

The basecoated substrate is placed on a metallizing rack. The metallizing rack is placed into a vacuum chamber which is evacuated down to a vacuum level of 5×10E-5 torr. About 50 standard cubic centimeters per minute of argon is introduced into the chamber. An electric arc is struck at the end of a chrome target. As the arc travels from the back end of the target to the front, its polarity is reversed, thereby causing the arc to move back and forth to evaporate the chrome and deposit it on the coated substrate. A current of 500 amps is applied to the target. After 30 minutes the argon flow rate of argon is increased to 75 standard cubic centimeters per minute and deposition of chrome is continued for another 30 minutes. The substrate is then allowed to cool inside the chamber and the chamber is vented. The chrome layer has a thickness of 4,800 Angstroms.

The substrate has the appearance of glossy chrome and is resistant to abrasion and corrosion.

While certain embodiments of the invention have been described for purposes of illustration, it is to be understood that there may be other additional various embodiments and modifications within the general scope of the invention.

I claim:

1. An article having on at least a portion of its surface a two layer coating consisting essentially of:

a layer comprised of a polymeric material; and a protective and decorative top layer comprised of a metal containing material selected from the group consisting of chrome, chrome/nickel alloy and chromium nitride directly on said layer comprised of polymeric material.

2. The article of claim 1 wherein said layer comprised of chrome, chrome/nickel alloy, or chromium nitride is comprised of chrome.

3. The article of claim 2 wherein said polymeric material is selected from polycarbonate, polyacrylate, polymethacrylate, polyester, acrylonitrile-butadiene-styrene, nylon, polystyrene, styrene-butadiene, styrene-acrylonitrile, and blends and copolymers thereof.

4. The article of claim 2 wherein said article is comprised of metal.

5. The article of claim 2 wherein said article is comprised of metal alloy.

6. The article of claim 2 wherein said article is comprised of plastic.

7. The article of claim 1 wherein said layer comprised of chrome, chrome/nickel alloy, or chromium nitride is comprised of chrome/nickel alloy.

8. The article of claim 7 wherein said polymeric material is selected from polycarbonate, polyacrylate, polymethacrylate, polyester, acrylonitrile-butadiene-styrene, nylon, polystyrene, styrene-butadiene, styrene-acrylonitrile, and blends and copolymers thereof.

9. The article of claim 7 wherein said article is comprised of metal.

10. The article of claim 7 wherein said article is comprised of metal alloy.

11. The article of claim 7 wherein said article is comprised of plastic.

12. The article of claim 7 wherein said article is part of the exterior of a motor vehicle.

13. The article of claim 8 wherein said article is a wheel cover.

14. The article of claim 1 wherein said layer comprised of chrome, chrome/nickel alloy or chromium nitride is comprised of chromium nitride.

15. The article of claim 14 wherein said polymeric material is selected from polycarbonate, polyacrylate, polymethacrylate, polyester, acrylonitrile-butadiene-styrene, nylon, polystyrene, styrene-butadiene, styrene-acrylonitrile, and blends and copolymers thereof.

16. The article of claim 14 wherein said article is comprised of metal.

17. The article of claim 14 wherein said article is comprised of metal alloy.

18. The article of claim 14 wherein said article is comprised of plastic.

19. The article of claim 14 wherein said article is part of the exterior of a motor vehicle.

20. The article of claim 19 wherein said article is a wheel cover.

21. An article having on at least a portion of its surface a two layer coating consisting essentially of:
    layer comprised of polymeric material; and
    protective and decorative top layer comprised of chrome directly on said layer of polymeric material.

22. An article having on at least a portion of its surface a two layer coating consisting essentially of:
    layer comprised of polymeric material;
    protective and decorative top layer comprised of chrome/nickel alloy directly on said layer of polymeric material.

23. An article having on at least a portion of its surface a two layer coating consisting essentially of:
    layer comprised of polymeric material;
    protective and decorative top layer comprised of chromium nitride directly on said layer of polymeric material.

* * * * *